United States Patent [19]

La Fleur

[11] 4,016,021
[45] Apr. 5, 1977

[54] HEAT SEALING UNIT AND METHOD OF MAKING SAME

[76] Inventor: Lee La Fleur, 273 River St., Manistee, Mich. 49660

[22] Filed: Mar. 29, 1976

[21] Appl. No.: 671,580

[52] U.S. Cl. .......................... 156/154; 93/DIG. 1; 100/211; 156/207; 156/210; 156/582; 156/583; 219/243; 219/244

[51] Int. Cl.² .............. B30B 15/34; B32B 31/00; H05B 3/34

[58] Field of Search .......... 156/583, 582, 580, 515, 156/91, 154, 153, 169, 205, 207, 210, 250, 267; 219/243, 244; 100/93 P, 93 RP, 211, 295; 93/DIG. 1; 53/39, 373, 379

[56] References Cited
UNITED STATES PATENTS

| 616,479 | 12/1898 | Martin | 156/210 |
|---|---|---|---|
| 2,711,382 | 6/1955 | Smith-Johannsen | 156/227 |
| 3,269,885 | 8/1966 | Cianci | 219/243 |
| 3,271,560 | 9/1966 | Schott, Jr. | 219/243 |
| 3,461,021 | 8/1969 | Brinkmeier et al. | 53/373 |

Primary Examiner—Charles E. Van Horn
Assistant Examiner—M. G. Wityshyn
Attorney, Agent, or Firm—Barnes, Kisselle, Raisch & Choate

[57] ABSTRACT

A heat sealing unit for producing a heat sealed seam on plastic films wherein a plurality of fins made of thin ductile metal having good heat conducting properties are mounted on a thin flexible heating element. The heating element is in turn mounted on a resiliently compressible back-up pad. The fins are closely spaced and flattened against the heating element in overlapping relation so that they provide a relatively large heat sink and at the same time enable the unit to flex so as to conform to the contour of the plastic films to be heat sealed.

23 Claims, 7 Drawing Figures

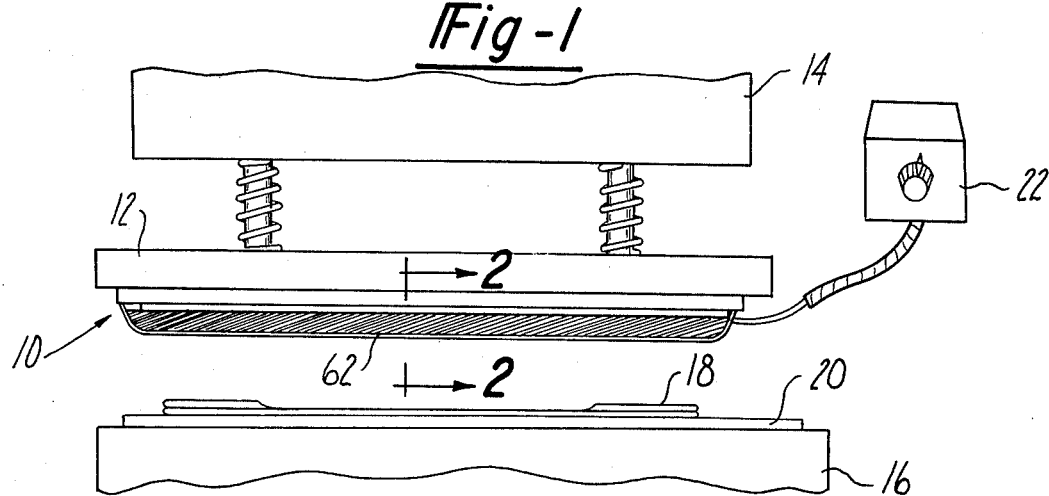
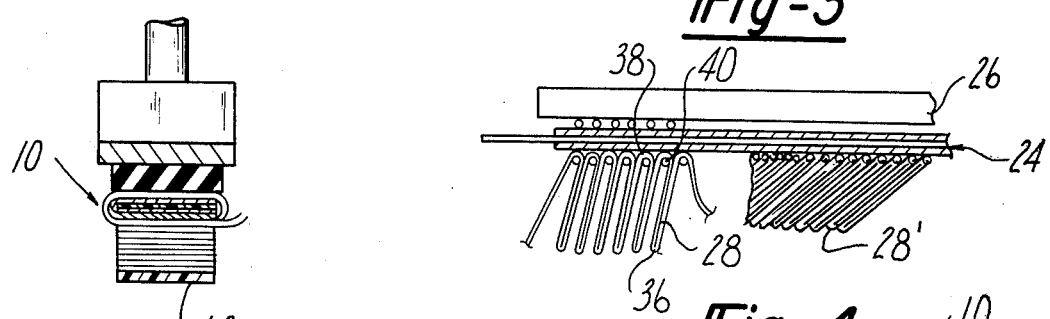
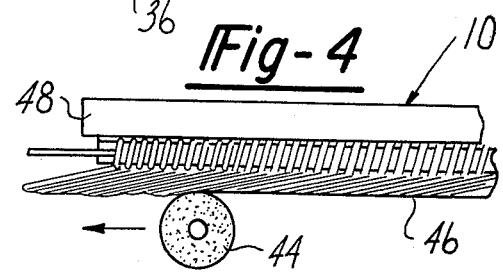
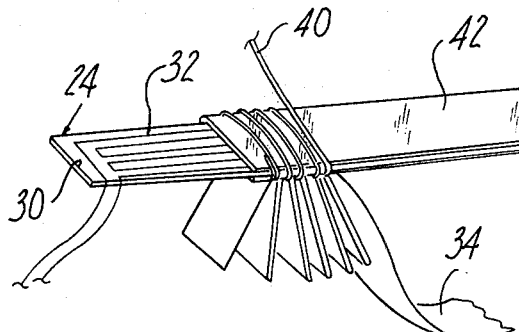
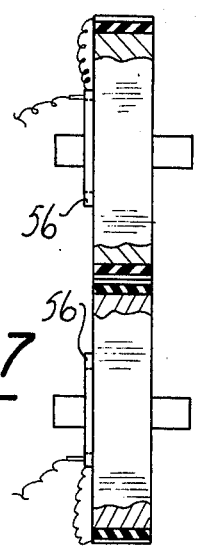
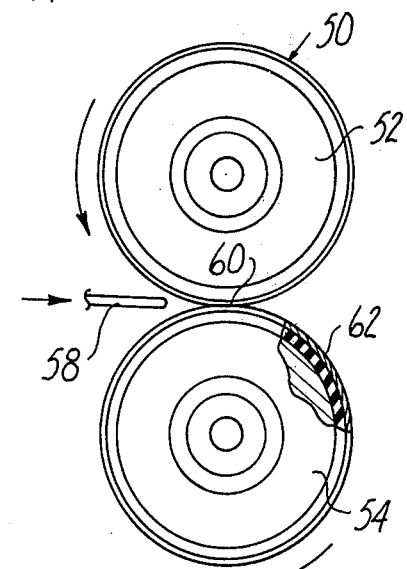

HEAT SEALING UNIT AND METHOD OF MAKING SAME

This invention relates to a heat sealing device and, more particularly, to a device for producing heat sealed seams on plastic films and the method of making such a device.

Many articles of manufacture, bags, for instance, are made from plastic films having portions which are joined or adherred together by heat sealing. Heat sealing devices for plastic films have taken many different forms but in general each comprises a metal strip or bar which is heated to the temperature desired for producing the desired heat sealed seam. One of the problems frequently encountered in sealing plastic films is the inability to obtain a uniform heat sealed seam where the number of film plies along the seam varies. For example, at one portion of a plastic bag seam there may be two plies of plastic film and at another portion of the same seam there may be four or more plies. Obviously such variation in the number of plies produces a non-uniform thickness along the seam line. Uneven seam surfaces also result where the surface of which the plastic film is supported is not smooth. It also happens that sometimes the support surface is either intentionally or unintentionally curved. Under such conditions (that is, an uneven or a curved surface along the seamline) imperfect seams frequently result when the heat sealing device is of the type which utilizes a relatively rigid heated bar or strip.

It is an object of this invention to provide a heat sealer which can be constructed economically and which is adapted to produce uniform heat sealed seams on plastic film where the seam line is not perfectly flat.

Another object of the invention is to provide a heat sealing device having a readily flexible heat sealing surface designed to conform to a non-uniform or a curved surface along the seam line.

Another object of the invention resides in a unique method of constructing a flexible heat sealing device.

More specifically, the present invention is directed to a heat sealing device wherein the heat sealing surface comprises a series of relatively movable individual metal fins arranged in partially overlapping relation. At one end thereof, the fins are mounted in heat conducting relation on a flexible heating element which is in turn mounted on a resiliently compressible back-up pad which enables the operative edge or surface of the heat sealer defined by the outer ends of the fins of shims to readily conform to irregularities or a curvature in the surface of the plastic films to be heat sealed.

Other features and advantages of the present invention will become apparent from the following description and accompanying drawings, in which:

FIG. 1 is an elevational view of a heat sealing unit embodying the present invention;

FIG. 2 is a sectional view along line 2—2 of FIG. 1;

FIG. 3 is a fragmentary sectional view of a portion of the unit illustrating two stages of its manufacture;

FIG. 4 is a perspective view illustrating the manner in which the metal fins are secured to the heating element of the unit;

FIG. 5 is a generally diagrammatic view showing a preferred step in the manufacture of the unit;

FIG. 6 is a fragmentary elevational view showing a modified form of a heat sealing unit according to the present invention; and FIG. 7 is a vertical sectional view of the device shown in FIG. 6.

In the arrangement illustrated in FIG. 1 the heat sealing unit 10 of the present invention is shown, merely by way of example, mounted on a vertically reciprocating head 12 of a press 14 having a support platen 16. Numeral 18 designates plastic tube stock for making bags. Tube stock 18 is positioned on a pad 20 on platen 16. The sealing unit 10 is supplied with electric current through a suitable control 22 to heat the same to a desired temperature. When head 12 is lowered into engagement with plastic tube 18, sealing unit 10 produces a heat sealed seam across the plastic tube. In the arrangement illustrated the bag to be formed has gussets along the opposite side edges thereof so that, while the central portion of tube 18 consists of only two plies of plastic film, the side edge portions are shown substantially thicker since they comprise four plies of plastic film. For the purpose of illustration the thickness of tube 18 is shown exaggerated in FIG. 1.

The invention relates specifically to the construction of heating unit 10. Heating unit 10 comprises an electrical resistance heating element in the form of a ribbon 24 mounted on a rubber pad 26 and having a plurality of metal fins 28 secured thereto. As shown more clearly in FIG. 5, ribbon 24 comprises a flexible strip 30 of a heat resistant plastic material (such as Kappon, manufactured by DuPont Company) which supports an electrical resistance heating element 32. Ribbon 24 is preferably of the type illustrated in U.S. Pat. No. 3,916,148. Heating element 32 comprises an electrical resistor in the form of a ribbon or wire. Element 32 can be printed on strip 30, in which case it is covered with a thin layer or coating of electrical insulation (a film of Kappon, for example). If desired, element 32 can be an electrical resistor wire embedded between two strips of a flexible insulating material. Element 32 is preferably formed from an alloy sold by Driver-Harris Company of Harrison, New Jersey under the name Balco. As explained in U.S. Pat. No. 3,916,148, this alloy has a resistance which varies with and is substantially proportional to the temperature thereof within the operating range of the sealing unit. When resistor 32 is formed of such an alloy the temperature control 22 is of the type shown in U.S. Pat. No. 3,679,871. The temperature control supplies current to resistor 32 and utilizes the change in the resistance of the resistor to turn the supply of current on and off to maintain the resistor at a selected operating temperature. Then, when current is supplied to element 32 through the control 22, ribbon 24 is maintained at the desired operating temperature throughout the entire extent thereof.

The actual heat sealing surface of unit 10 is defined by the metal fins 28. As shown in FIGS. 3 and 5, fins 28 are preferably formed by corrugating a thin metal strip 34 having a width corresponding generally to the width of ribbon 24. Strip 32 is corrugated in the manner illustrated in FIG. 3 so as to form the strip into a plurality of accordian-pleated fins 28. By pleating strip 34 in this fashion the adjacent fins are connected at their outer ends along fold lines 36 and at their inner ends along fold lines 38. The accordian-pleated strip 34 is secured to one face of ribbon 24 by a thin wire 40. Preferably, ribbon 24 is wrapped with a thin strip of soft, ductile metal 42 having high heat conducting characteristics. The pleated strip 34 is placed against the wrapping 42 and wire 40 is wound around ribbon 24 in a direction transversely thereof so that it extends between adjacent fins 28 at the fold lines 38 as shown in FIGS. 3 and 5. Wire 40 is wound around ribbon 24 so that the successive convolutions thereof are closely spaced. The size of wire 40 and the thickness of strip 34 shown in FIGS. 2, 3 and 4 have been exaggerated for the purposes of illustration. The thickness of ribbon 24 is also shown exaggerated. In actual practice, strip 34 is preferably a strip of ductile or dead-soft copper foil having a thickness of about 0.004 inches and width of about ¼ inch. The thinness of strip 34 and its ductility are important features of the present invention as will become apparent hereinafter. Strip 34 can be formed of metal having a thickness greater than about 0.004 inches. Best results are obtained when the thickness of strip 34 is not more than about 0.010 inches. Wrapping strip 42, wire 40 and fins 28 are all formed from a metal which is a good heat conductor. This insures rapid and efficient transfer of heat from resistor 30 to fins 28. It will be noted that the physical arrangement of wrapper 42, strip 34 and wire 40 with ribbon 24 results in excellent heat transfer properties. Wire 40 is preferably formed of soft copper and has a diameter only sufficient to have the strength requirements for securing finned strip 34 to ribbon 24. Ribbon 24 is very flexible and also very thin. It may have a thickness on the order of 0.004 inches.

After strip 34 is accordian pleated and secured to ribbon 24 in the manner illustrated in FIG. 5, fins 28 are bent and pressed against ribbon 24 so that they are flattened against one another in overlapping relation as shown in 28' in FIG. 3. When fins 28 are flattened in this manner they provide a relatively solid strip or mass of copper adjacent one face of ribbon 24 which acts as a heat sink. Since the fins are made of a dead-soft material and since the assembly of fins 28 and ribbon 24 is mounted on a soft rubber pad 26, it follows that the entire assembly is readily flexible. When the heating unit 10 is pressed downwardly on an uneven or a curved surface the adjacent fins 28' are capable of moving relative to one another so that the outer ends thereof will conform to the surface.

The ability of fins 28' to conform to an uneven or curved surface is further enhanced if the fold lines 36 at the outer end thereof are removed or severed. This can be accomplished in any suitable manner, preferably in the manner illustrated in FIG. 4. FIG. 4 shows the heating unit 10 positioned relative to a grinding wheel 44 so that, upon relative translatory movement of the heating unit 10 and the grinding wheel 44, the outer ends of the flattened fins 28' will be ground off to present a straight flat heat sealing surface 46 which is substantially parallel to the plane of the rigid support bar 48 on which the unit is mounted for grinding purposes. Except for the fact that the outer ends of the fins are ground off, the unit shown in FIG. 4 is the same as that shown in FIG. 3. Excellent results have been obtained with heat sealing units of the present invention where the fins 28' have a length of about ¼ inch in their free state, but when flattened against ribbon 24 provide a heat sink having a thickness of about ⅛ inch.

FIGS. 6 and 7 show heating units 50 which are constructed the same as the heating units shown in FIGS. 2 and 3. However, the heating units 50, instead of being mounted on a straight bar such as illustrated at 12, are mounted around the outer periphery of a pair of rotatable discs 52, 54. In this type of arrangement the electrical current can be supplied to resistors 32 by means of slip rings 56 on the outer faces of discs 52, 54. In the arrangement illustrated in FIGS. 6 and 7 two discs are employed and are arranged in contacting tangential relation and the plastic films 58 to be heat sealed are directed between the two discs. Preferably the distance between the axes of discs 52, 54 is such that at the contacting portions thereof the heating units 50 are somewhat compressed and flattened as illustrated at 58 so as to obtain good pressure contact with the plastic films 60 to be heat sealed.

It will be appreciated that, if desired, instead of employing two discs as shown in FIG. 6, a single disc may be used in conjunction with a flat support pad as shown at 20 in FIG. 1. Likewise, it will be appreciated that in the arrangement illustrated in FIG. 1, instead of utilizing a fixed lower platen 16, a heat sealing unit may be employed on the bottom side of tube 18. It also follows that, if desired, the heating unit may be mounted on a curved support and the support platen may be similarly curved. Regardless of the contour of the support on which the heating unit is mounted, the arrangement of the flattened overlapping fins in combination with the compressible back-up pad enables the heat sealer to conform to irregularities in the surfaces being heat sealed. In addition, the heat sealing unit provides a relatively large heat sink which enables use of the unit at a high rate of production since each heat sealing operation does not substantially lower the temperature thereof.

In order to prevent the exposed ends of fins 28' from sticking to the plastic film being heat sealed, it is preferred to overlay the surface defined by these ends with a thin flexible strip 62 of heat resistant plastic, such as Kappon or Teflon.

I claim:

1. A device for heat sealing plastic films comprising an electrical resistance heating unit in the form of an elongated flexible ribbon, a plurality of thin metal fins extending outwardly from one side of the ribbon, means securing the inner ends of said fins to said ribbon so that the individual fins extend transversely of the ribbon in closely spaced relation, all of said fins being flattened in a direction lengthwise of and against the ribbon in overlapping contacting relation, the outer ends of said fins being generally uniformly spaced from said ribbon and defining a heat sealing surface for the device and a resiliently compressible backing strip positioned against and secured to the other side of the ribbon.

2. A device as called for in claim 1 wherein the width of the fins corresponds generally to the width of said heating unit.

3. A device as called for in claim 1 wherein said fins are formed of metal foil.

4. A device as called for in claim 1 wherein said fins have a thickness of not more than about 0.010 inch.

5. A device as called for in claim 1 wherein said fins are formed from a soft ductile metal.

6. A device as called for in claim 1 including a relatively rigid support member on which said backing strip is mounted.

7. A device as called for in claim 1 including means electrically insulating said fins from the heating unit.

8. A device as called for in claim 1 wherein the fins in successive pairs are interconnected at their inner ends by a fold line.

9. A device as called for in claim 8 wherein the means securing the fins to said ribbon comprises a filament.

10. A device as called for in claim 9 wherein the filament extends transversely around said ribbon and between the fins at said fold lines.

11. A device as called for in claim 10 wherein said filament is wound continuously around said ribbon with the successive convolutions thereof closely spaced.

12. A device as called for in claim 9 wherein said filament comprises a wire.

13. A device as called for in claim 12 wherein said wire is formed of a high heat conducting material.

14. A device as called for in claim 13 wherein said wire is in heat conducting contact with said ribbon and said fins.

15. A device as called for in claim 1 wherein said ribbon comprises a plastic strip having an electrical resistance element embedded therein.

16. A device as called for in claim 1 wherein said ribbon comprises a plastic strip having an electrical resistance element bonded thereto.

17. A device as called for in claim 16 including electrical insulating means overlying said electrical resistance element.

18. A device as called for in claim 8 wherein the fins in successive pairs are connected at their outer ends by a bend line.

19. A device as called for in claim 1 wherein said backing strip is circular and said heating unit extends around the outer periphery thereof.

20. A device as called for in claim 1 wherein said backing strip is linear and said heating unit is mounted along one side thereof.

21. The method of making a device for heat sealing plastic films which comprises the steps of folding a thin metal strip transversely along regularly spaced lines to form the strip into a succession of accordian-pleated fins having fold lines extending transversely of the strip, securing the apexes along one side of the pleated strip in closely spaced relation to a strip of flexible electrical resistance heating element, flattening the pleated elements against said heating element in a direction lengthwise of the heating element strip so that the successive fins lie one against the next in partially overlapping relation, mounting said heating element strip with the fins thereon on a relatively rigid backing member and thereafter removing the outer end portions of the fins from the pleated strip along a line generally parallel to the backing member.

22. The method called for in claim 21 wherein a sufficient amount of material is removed from the outer ends of the pleated strip to sever the fins from one another at their outer ends.

23. The method called for in claim 22 wherein the outer end portions of the pleated fins are removed by grinding the same.

* * * * *